(12) United States Patent
Wessels

(10) Patent No.: US 10,485,375 B2
(45) Date of Patent: Nov. 26, 2019

(54) BEVERAGE PREPARATION DEVICE AND METHOD FOR PREPARING A BEVERAGE

(71) Applicant: Koninklijke Douwe Egberts B.V., Utrecht (NL)

(72) Inventor: Hendrikus Christinus Maria Wessels, Utrecht (NL)

(73) Assignee: Koninklijke Douwe Egberts B.V., Utrecht (NL)

( * ) Notice: Subject to any disclaimer, the term of this patent is extended or adjusted under 35 U.S.C. 154(b) by 127 days.

(21) Appl. No.: 15/009,159

(22) Filed: Jan. 28, 2016

(65) Prior Publication Data
US 2016/0143475 A1    May 26, 2016

Related U.S. Application Data

(63) Continuation of application No. PCT/NL2014/050523, filed on Jul. 28, 2014.

(30) Foreign Application Priority Data

Jul. 29, 2013   (NL) ..................................... 2011233

(51) Int. Cl.
*A47J 31/44*   (2006.01)
*G07F 9/02*    (2006.01)
(Continued)

(52) U.S. Cl.
CPC ............. *A47J 31/4403* (2013.01); *A23L 2/52* (2013.01); *A47J 31/402* (2013.01); *A47J 43/27* (2013.01);
(Continued)

(58) Field of Classification Search
CPC . A23L 2/52; A47J 31/402; A47J 43/27; G07F 9/023; G07F 13/065; G07F 17/0078
(Continued)

(56) References Cited

U.S. PATENT DOCUMENTS

| 8,032,251 B2 | 10/2011 | Monn | |
|---|---|---|---|
| 2008/0183330 A1* | 7/2008 | Monn | ........................ G07F 9/02 700/239 |

(Continued)

FOREIGN PATENT DOCUMENTS

| CN | 101218611 A | 7/2008 |
|---|---|---|
| CN | 101730494 A | 6/2010 |

(Continued)

OTHER PUBLICATIONS

International Search Report and Written Opinion, PCT/NL2014/050523, Koninklijke Douwe Egberts B.V., 10 pages (dated Dec. 16, 2014).

(Continued)

*Primary Examiner* — Phuong T Nguyen
(74) *Attorney, Agent, or Firm* — Foley & Lardner LLP

(57) ABSTRACT

A beverage preparation device is provided comprising a preparation unit for preparing a beverage. The preparation unit is arranged for controllably blending a plurality of ingredients incorporable in the beverage. The device further comprises a control unit for enabling a user to control the preparation unit and that comprises a graphical user interface and a processing unit. The graphical user interface has an operational mode enabling the user to indicate a position in an at least two-dimensional space. Therein a respective value of said at least a first and a second parameter is set in accordance with respective components of the indicated position in respective directions in said space, the respective value of said at least a first and second parameter being dependent on the components of said position in said respective directions in a monotonic manner. Subsequently the processing unit drives the preparation unit in accordance with the formulation specified by the user.

9 Claims, 12 Drawing Sheets

(51) Int. Cl.
*G07F 13/06* (2006.01)
*G07F 17/00* (2006.01)
*A47J 31/40* (2006.01)
*A47J 43/27* (2006.01)
*A23L 2/52* (2006.01)
*A47J 31/42* (2006.01)

(52) U.S. Cl.
CPC ............ *G07F 9/023* (2013.01); *G07F 13/065* (2013.01); *G07F 17/0078* (2013.01); *A23V 2002/00* (2013.01); *A47J 31/42* (2013.01)

(58) Field of Classification Search
USPC ....... 99/280, 285, 323.3; 426/231, 433, 594, 426/429, 430, 431, 435, 590, 597, 432
See application file for complete search history.

(56) References Cited

U.S. PATENT DOCUMENTS

| | | |
|---|---|---|
| 2008/0201241 A1 | 8/2008 | Pecoraro |
| 2010/0138053 A1 | 6/2010 | Kollep |
| 2012/0035761 A1 | 2/2012 | Tilton et al. |
| 2013/0164422 A1* | 6/2013 | McCormick .......... A47J 31/545 426/433 |
| 2014/0018827 A1 | 1/2014 | Leiber |
| 2015/0351582 A1 | 12/2015 | Roth et al. |

FOREIGN PATENT DOCUMENTS

| | | |
|---|---|---|
| CN | 101842309 A | 9/2010 |
| EP | 1 749 464 | 2/2007 |
| EP | 1 992 263 | 5/2007 |
| EP | 2 474 255 | 12/2011 |
| WO | WO 2007/003062 | 1/2007 |
| WO | WO-2009/135821 | 11/2009 |
| WO | WO 2011/046428 | 4/2011 |
| WO | WO2011/046428 A1 * | 4/2011 .............. A47J 31/44 |
| WO | WO 2013/067020 | 5/2013 |
| WO | WO 2015/016708 | 2/2015 |

OTHER PUBLICATIONS

English-language machine translation of EP 2 474 255, Severin Elektrogerate GmbH (Dec. 10, 2011).

* cited by examiner

BEVERAGE PREPARATION DEVICE AND METHOD FOR PREPARING A BEVERAGE

CROSS-REFERENCE TO RELATED PATENT APPLICATIONS

This application is a continuation of International Patent Application No. PCT/NL2014/050523, filed Jul. 28, 2014, which claims the benefit of priority to Netherlands Application No. NL 2011233, filed Jul. 29, 2013, all of which are hereby incorporated herein by reference in their entireties.

BACKGROUND

The invention relates to a beverage preparation device.

The invention further relates to a method for preparing a beverage.

The invention further relates to a computer program product for controlling a beverage preparation device for preparing a beverage.

The invention still further relates to a record carrier comprising the computer program product.

Nowadays, automatic devices for preparing beverages provide the user with more and more options for controlling the composition and other parameters of the beverage to deliver.

Examples of such parameters are the blend between the main product (usually coffee) and the additives (usually milk); the blend between the main product and one or more flavors; the blend of different additives (e.g., 50-50 soy milk and skimmed milk); the drink strength; the drink volume; any other parameter that influences the drink taste (e.g., temperature, foam layer, pre-infusion, pressure).

Recently devices have become available that are equipped with a plurality of containers intended for holding different types of coffee and with a blender for blending coffee from these containers according to a certain blending ratio. Typically the blending ratio is set according to a predetermined setting by the manufacturer or by an operator. In a 3 ingredient device, the ingredients may for example be mixed according to a ratio of 25%-25%-50%.

Enabling a user to control the blending ratio is considered an attractive feature, but this would make operation of the device even more complicated.

It is further a complicating factor that once the process of delivering the beverage is started it cannot be undone without wastage of material, e.g. the ingredients of the beverage that was already delivered. Also, if the automatic device can only deliver the beverage with built in disposables, this implies that the cup used for the erroneously brewed delivery is lost for further use.

SUMMARY

It is an object of the present invention to provide a beverage preparation device and a method of preparing a beverage that gives the user a better overview of possible selections in order to mitigate the risk of erroneous selections.

This object is achieved by the device as claimed in claim 1 and the method as claimed in claim 9. In the device and method according to the present invention the respective values of said at least a first and second parameter are dependent on the position in said at least two directions in a monotonic manner. Therewith the user is offered a very intuitive control of the composition and other features, such as the temperature of the beverage, to be prepared. The user interface offers the user a landscape of possible options, wherein a change of the selection results in a predictable change in the preparation parameters.

In an embodiment the first parameter is a relative contribution of ingredients in a blend of ingredients and the second parameter is the concentration of the blend of ingredients in water.

It is noted that in practical digital implementations the relationship between the value of the controlled parameter and the indicated position in the corresponding direction will be stepwise monotonic. Nevertheless, the size of the steps can be so small that they are not perceived by the user. The value of the controlled parameter may be linearly dependent on the indicated position, but alternatively a non-linear relationship may be applied, for example to compensate for non-linear effects in the way a user perceives a change in value of a certain parameter.

Due to the fact that the respective value of said at least a first and second parameter are dependent on the position in said at least two directions in a monotonic manner it is not necessary that the user interface exactly specifies the preparation parameters for each selection position. Instead the user interface may display an image in the area from which the user may select a position that gives an impression how the preparation parameters are related to the position.

The method and device are in particular suitable to enable a user to specify a blend of ingredients, for example a blend of two different types of coffee and or a blend with one or more flavors. The coffee may be provided in a liquid form (e.g., in a concentrated coffee solution) or in a solid form (e.g., in the form of beans which may be ground). In the method and device according to the present invention the most extreme selections, i.e., a beverage brewed using only one of the possible ingredients can be represented by a characteristic image. This is for example a picture expressing the nature of the ingredient, e.g., a picture of a volcano for a very strong coffee and a picture of a lake to indicate a mild coffee. A movement in a direction between these extremes corresponds to a gradually changing composition of the blend. Accordingly, it is sufficient that only the extremes are represented as the user can predict, due to the monotonic relation between the position and the resulting composition, what the effect will be of a selection of an intermediate position. Various options are possible to represent a particular taste. In another embodiment, the ingredients may be represented by keywords for example, e.g., arranged in so called Wordle™.

In an embodiment the graphical user interface has a first operational state wherein the user is enabled to drag a selection object from an initial position to a further position corresponding with the desired formulation, and a second operational state wherein the user is enabled to activate said selection object in said further position. This two-step procedure and the requirement that the user activates the selection object in the further position corresponding with the desired formulation enables a conscious decision and avoids that an erroneous selection is made. Preferably the graphical user interface assumes the second operational state when the user releases the touch screen after having dragged the selection object to the further position.

In an embodiment the graphical user interface for enabling a user to specify a formulation is arranged to display a background image, and after designation of a position, to display a further background image corresponding to a selection of said background image corresponding to the designated position. The subsequently displayed selection provides additional feedback to the user that the device indeed has accepted the intended selection.

Subsequently the user may desire to add a further ingredient, such as milk or sugar. To that end, in a subsequent operational state a holder for a beverage is presented filled for a first fraction with a first color indicative for a fraction of a blend of ingredients selected by the user and a second color indicative for the further ingredient, the user being enabled to determine the amount of said ingredient by shifting a visual control element. The differently colored fractions of the holder give the user a clear impression of the relative amount of ingredients present in the beverage to be prepared with the current settings. By shifting a visual control element the user can easily change the composition if desired and readily see the result of this action.

Alternatively in the subsequent operational state the holder may be displayed with a color that is a weighted average of a first color indicative for the selected blend of ingredients and a second color indicative for the further ingredient, wherein in the applied weighting the contribution of the first color corresponds to the fraction of the selected blend of ingredients and the contribution of the second color corresponds to the fraction of the further ingredient. Similarly the user can be enabled to determine the amount of said ingredient by shifting a visual control element. Alternatively, the user may change the specification by other means, e.g., by soft buttons, e.g., a "+" button for adding more of the further ingredient and a "−" button for adding less of the further ingredient.

BRIEF DESCRIPTION OF THE DRAWINGS

These and other aspects are described in more detail with reference to the drawing. Therein.

DETAILED DESCRIPTION

Figure 1:
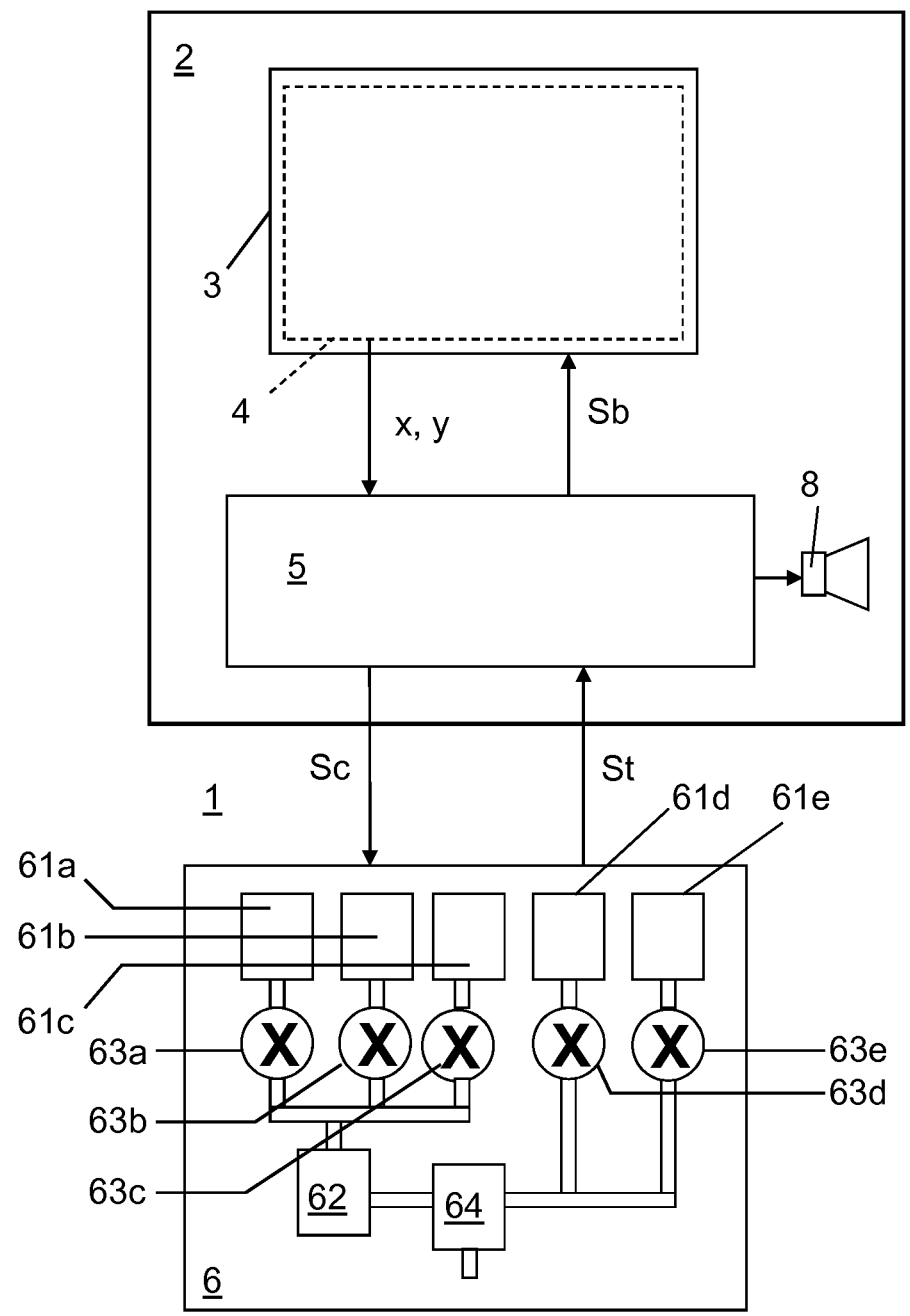
FIG. 1 schematically shows an embodiment of an automatic device 1 according to the present invention for preparing a beverage.

In the following detailed description numerous specific details are set out to provide for a thorough understanding of the present invention. It will be clear to the skilled person that these details are not essential to the present invention. In other instances, generally known methods, procedures and components are not described in detail to thereby avoid more essential aspects of the invention being veiled.

It will be clear to the skilled person that the terms "first", "second", "third" in this description can be used to distinguish parts from each other, without thereby indicating any priority. Hence, a first element, component, area, field, module, etc., could also be called a second element, component, area, field, module, etc., without departing from the scope of protection of the present application.

In the drawings, parts are normally not shown to scale. In some instances, parts are shown in a magnified representation for clarity.

Unless indicated otherwise, all terms have the meaning given to them by the person skilled in the art of the present invention. Further, terms such as they are defined in commonly used reference works and dictionaries are understood to be interpreted in accordance with their meaning in the context of the technical field relevant in this case and not to be interpreted in an idealized or unduly formal sense, unless expressly indicated otherwise. In the event of a difference in interpretation of a term, the interpretation given to it by the present application shall be decisive.

Corresponding parts have mutually corresponding reference numerals.

FIG. 1 schematically shows an embodiment of an automatic device 1 for preparing a beverage. The device 1 is provided with a preparation unit 6 and with a control unit 2. The preparation unit 6 is configured for preparing a beverage according to a formulation specified by a user. The preparation unit 6 can prepare, for example, a plurality of beverages such as water, tea, coffee, chocolate milk and soup. In a practical embodiment, the beverages can be provided with additions, such as sugar, milk and aromas. If desired, also a temperature of the beverage to be poured can be set. In an embodiment, the preparation unit 6 is provided with inter alia holders 61$a$, 61$b$, 61$c$ for storage of various types of coffee, and holders 61$d$, 61$e$ for other ingredients such as sugar and milk and possibly one or more flavors such as caramel, hazelnut or vanilla. The embodiment shown is furthermore provided with a heating unit 62, dosing valves 63$a$-63$e$ for dosing the ingredients from the respective holders 61$a$-61$e$ and a beverage outlet 64.

The control unit 2 is provided with a display panel 3 and a touch-panel 4 integrated therewith which enables a user to specify a formulation for the beverage to be prepared. Upon touching, the touch-panel 4 delivers a position signal x, y, which is indicative of the position where the display panel 3 has been touched. Alternatively or in addition, the user may be enabled to designate a position on the display panel in a noncontact manner, for example, by pointing at that position, or by giving spoken commands. The control unit 2 is furthermore provided with a processing unit 5 for controlling the display panel 3 so as to provide a visually observable reaction to designations provided by the user, and for controlling the preparation unit 6 of the automatic device 1. To this end, the processing unit 5 receives the position signal x, y from the input means, and the processing unit 5 controls the display panel with an image signal Sb. The processing unit 5 controls the preparation unit with control signals Sc. In addition, the processing unit 5 can receive condition signals St from the preparation unit 6 which are indicative of a condition of the preparation unit. The condition signals St can indicate, for example, the filling degree of the holders 61$a$, 61$b$, 61$c$, or the height of a temperature reached by the heating unit 62. The control unit may further give audio feedback via speaker 8.

Figure 2:
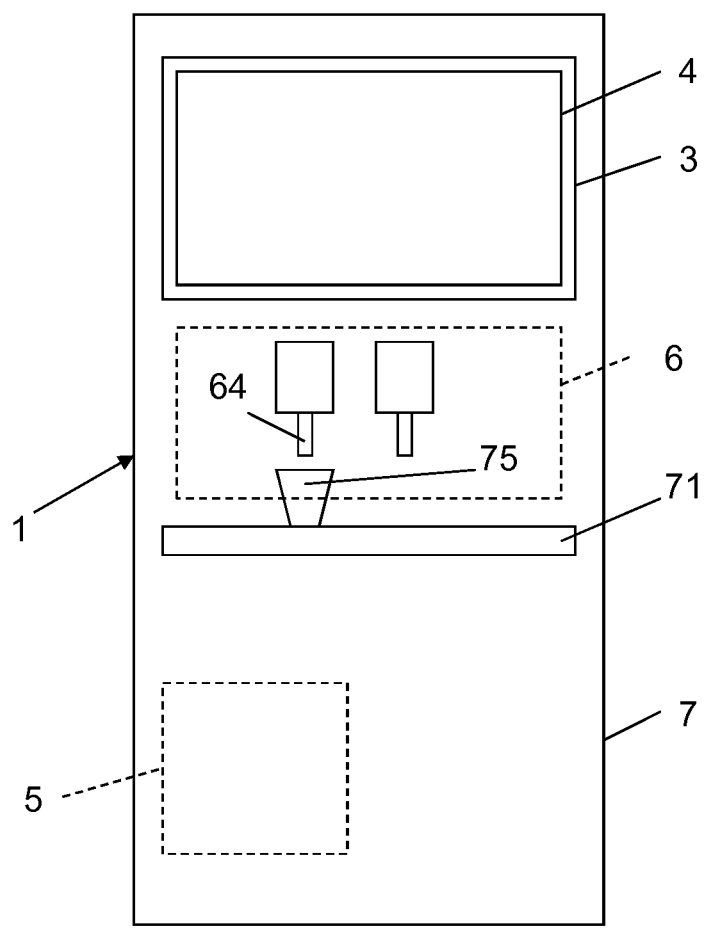
FIG. 2 shows an example of a practical setup of components of the automatic device of FIG. 1, FIG. 3A schematically shows a user interface in an operational state of the automatic device of FIG. 1.

FIG. 2 shows a practical setup of components of the automatic device. Parts therein that correspond to those from FIG. 1 have the same reference. In the practical embodiment shown, the device has a housing 7 for the parts shown in FIG. 1. The housing 7, furthermore, has a support 71 for supporting a beaker 75. The beaker 75 can be placed there, for example, by the user or by a placing mechanism.

Figure 3A:
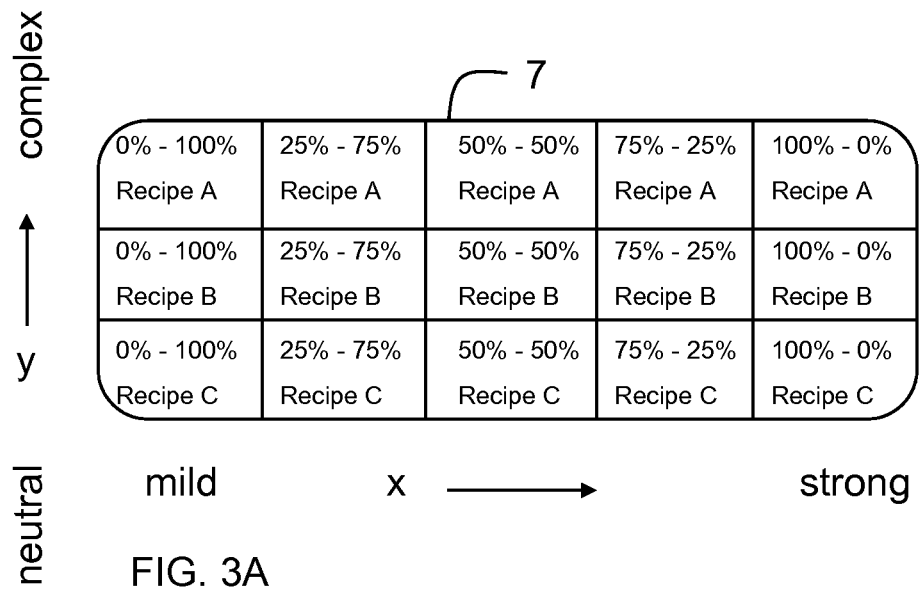
FIG. 3B shows in more detail a component of the automatic device of FIG. 1, FIGS. 4A and 4B show some examples of functions that determine the relationship between the coordinates indicated by the user and the resulting settings for the beverage to be prepared.
Figure 3B:
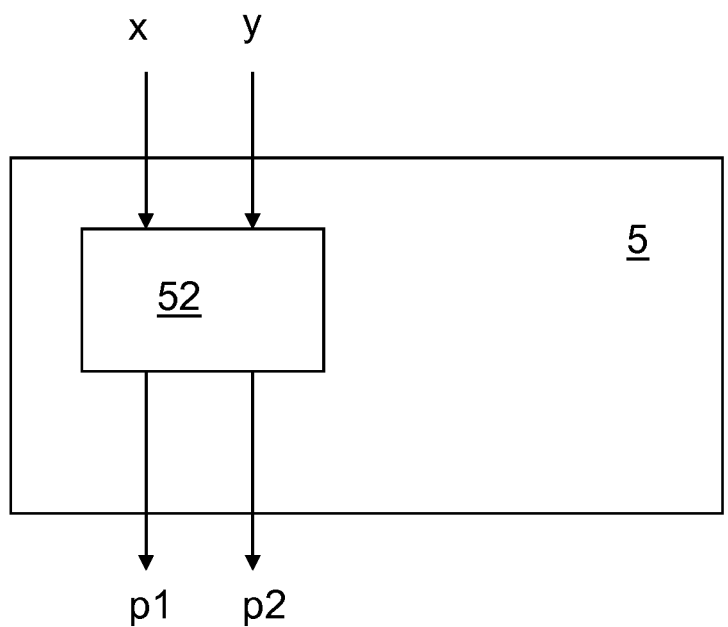

With reference to FIGS. 3A and 3B now a graphical user interface of the automatic device 1 is presented. The graphical user interface enables a user to specify a formulation for the beverage to be prepared in accordance with at least a first and a second parameter. The first and second parameter may be selected for example from a ratio wherein different types of a main ingredient, e.g. coffee are blended, a ratio wherein (a) main ingredient(s) is blended with an additive, such as milk, and a ratio wherein different additives are blended (e.g. 50-50 soy milk and skimmed milk). Other parameters from which a selection may be made are for example the drink strength, the drink volume and any other parameters that influence the drink taste (e.g. temperature, foam layer, pre-infusion, pressure).

The graphical user interface has an operational mode enabling the user to indicate a position in an at least two-dimensional space. Then values of the parameters are set in accordance with respective components of the indicated position in different directions in the space where the user indicates the position. The values of the parameters are dependent on the components of the position in these different directions in a stepwise monotonic manner.

An example thereof is illustrated in FIGS. 3A and 3B. FIG. 3A schematically illustrates an embodiment wherein a user is enabled to indicate a position in a two-dimensional selection space 7 with coordinates x,y. The x-direction corresponds to a parameter that indicates the blend between two types of coffee. For example, a mild coffee and a strong coffee. Therein the fraction of the strong type of coffee increases stepwise with the position in the x-direction as is further schematically shown in FIG. 4A. In this example, a first range corresponds to a recipe for a drink that only comprises coffee of the mild type. A second range corresponds to a recipe for a blend of 75% coffee of the mild type and 25% of coffee of the strong type. A third range corresponds to a recipe for a blend comprising equal parts of coffee of the mild and of the strong type. A fourth range corresponds to a recipe for a blend of 25% coffee of the mild type and 75% of coffee of the strong type. A fifth range corresponds to a recipe for a drink that only comprises coffee of the strong type. For practical purposes this partitioning in five-steps has proven to be sufficient as most users do not perceive finer blending variations in the blending ratio. However, if desired a more fine grained partitioning may be applied to the blending ratio. Alternatively a more course grained partitioning, e.g. into a first, a second and a third range may be applied, wherein the first and the third range respectively represent a recipe for a drink that respectively comprises either the mild or the strong type of coffee and the second range represents a blend with equal contributions of each type of these coffees.

As can be seen in FIG. 3A, the y-direction corresponds to the 'complexity' of the drink to be prepared. The complexity of the drink changes monotonously from the neutral recipe C, via the medium complex recipe B to the complex recipe A.

FIG. 3B shows that the processing unit 5 has a mapping unit 52 that sets a respective value of at least a first and a second parameter p1, p2 in accordance with respective components x, y of the indicated position in respective directions in said space. The respective value of the at least a first and second parameter are dependent on the components of the position in these directions in a monotonic manner.

Figure 4A:
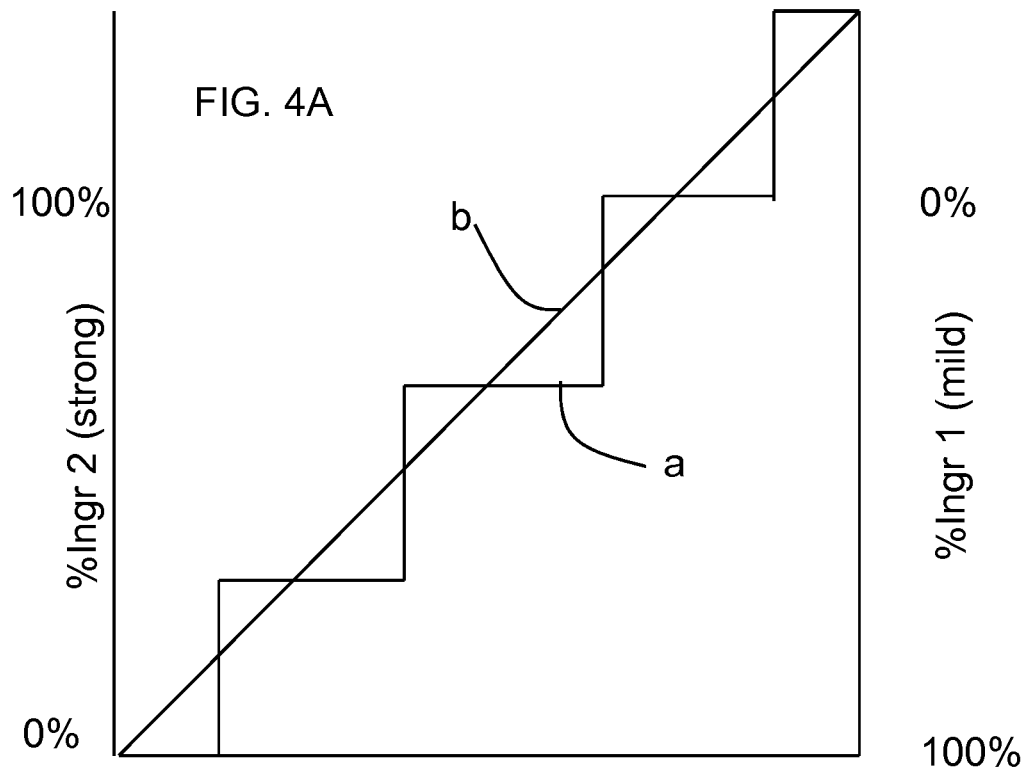
Figure 4B:
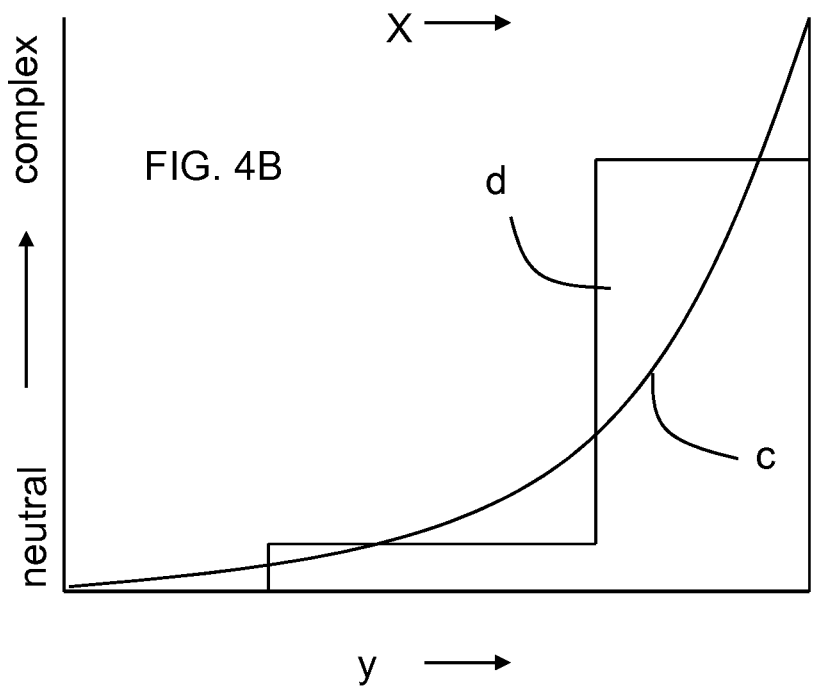

FIGS. 4A and 4B shows some examples of functions that determine the relationship between the coordinates indicated by the user and the resulting settings for the beverage to be prepared.

FIG. 4A shows examples of a functions that map the contribution of each of the ingredients 1 and 2 to the component x of the position. Curve a shows a first function according to which the contribution of ingredient 2 increases monotonously with equal steps. Here with steps of 25%. As ingredient 2 is the only other component, its contribution decreases with 25% at each step. Curve b shows an alternative monotonous function, according to which the contribution of ingredient 2 increases substantially continuously. Example of a relation between the component y of the position and the resulting parameter complexity are shown in FIG. 4B. Therein curve c shows a non-linear monotonous function, according to which the complexity increases substantially continuously. In this example the complexity increases relatively fast for low values of y and more slowly for relatively high values of y. Such a non-linear relationship can be useful to compensate for non-linearities in the perception of the user. For example the user may be very sensitive for variations of the concentration of ingredients at high dilutions, but less sensitive at low dilutions. In this example the concentration of the ingredients increases more strongly as a function of component y if the concentration is higher. This has the effect that equal changes in component y of the indicated position result in comparable changes in perception of taste. Also in this case the function mapping the component of the position to the parameter may be a stepwise monotonic function as is illustrate by the stepwise monotonically increasing function d in FIG. 4B.

Figure 5:
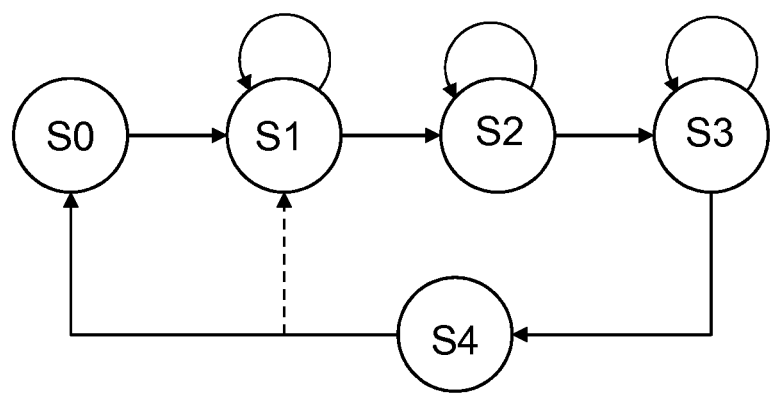
FIG. 5 shows a state diagram in an exemplary embodiment of a beverage preparation device according to the invention.

FIG. 5 shows a state diagram in an exemplary embodiment of a beverage preparation device according to the invention. For purpose of clarity a very simple state diagram having five discrete operational states S0, . . . , S4 is shown. It will be understood however that the device may in practice have more operational states organized in a substantially more complex state diagram, for example to take into account other beverage types, and maintenance schemes. In the embodiment shown the state diagram has an initial operational state S0, for example to perform a self-diagnosis and to verify whether ingredients are present in a sufficient amount. The graphical user interface has a first operational state S1 wherein the user is enabled to drag a selection object from an initial position to a further position corresponding with the desired formulation and a second operational state S2 wherein the user is enabled to activate said selection object in said further position.

By way of example FIGS. 6A to 6D shows a graphical user interface in the first operational state S1 of the device.

In this particular embodiment a background image is presented that comprises 4 quadrants that each are representative for the boundaries of the range wherein the formulation can be set. In this example the image presented corresponds to the selection range illustrated in FIG. 3A. I.e. the upper left quadrant corresponds to recipe A with 100% mild coffee, the upper right quadrant corresponds to recipe A with 100% strong coffee, the lower left quadrant corresponds to recipe C with 100% mild coffee and the lower right quadrant corresponds to recipe C with 100% strong coffee.

Figure 6A:
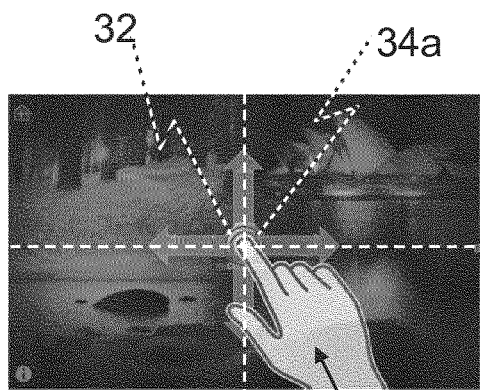
FIGS. 6A, 6B, 6C, 6D show some more detailed examples of a graphical user interface suitable for display in an operational state of automatic device of FIG. 1.
Figure 6B:
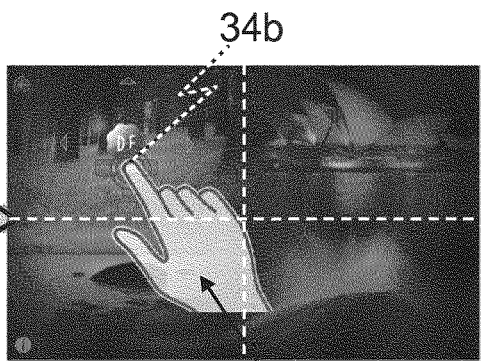
Figure 6C:
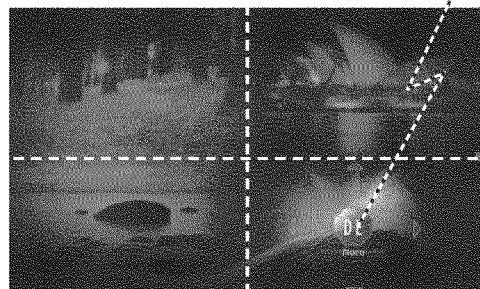
Figure 6D:
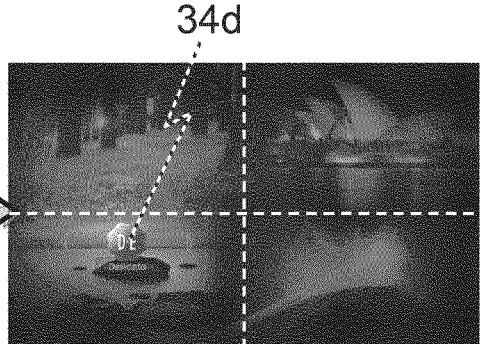

Initially, as shown in FIG. 6A, the selection object 32, here represented as the DETM-logo is displayed in a reference position, typically a position 34a in the centre of the screen. The user 9 may then drag the selection object to a position in the selection space 7 that corresponds to a desired composition of the beverage to be prepared, e.g. position 34b (FIG. 6B), 34c (FIG. 6C) or 34d (FIG. 6D). Due to the monotonic relation between the position and the resulting composition, the user can predict the effect of a selection of a position intermediate the extreme positions. Accordingly, it is sufficient that only the extremes of the composition range are presented to the user. Therewith a relatively large image area is available for this presentation allowing the user to have a clear impression of the available options.

Figure 7A:
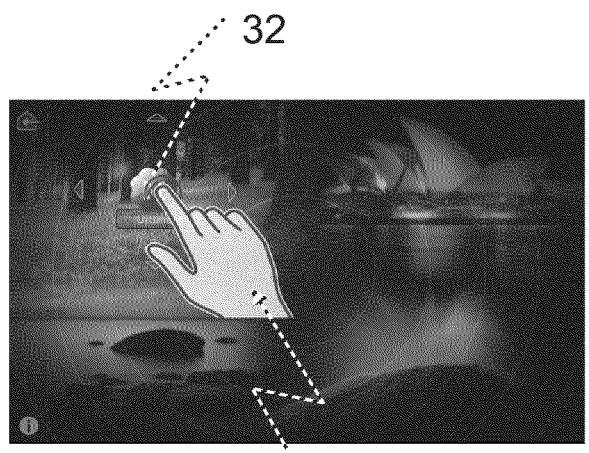
FIGS. 7A, 7B shows some other examples of a graphical user interface suitable for display in an operational state of automatic device of FIG. 1, FIG. 8 schematically shows another user interface in an operational state of the automatic device of FIG. 1, FIGS. 9-11 schematically shows further examples of a user interface in said operational state, FIG. 12 schematically shows an embodiment of a method for preparing a beverage.

In the present embodiment the device remains in the first operational state S1 unless the user explicitly acknowledges the selection. The acknowledgment of the selection may for example be made by tapping at the selection object 32 as shown in FIG. 7A. Alternatively the user may acknowledge the selection by pressing an OK button, which may be present as a virtual button on the touch screen or as a physical button on the housing of the device. In again another embodiment the user may simply acknowledge by releasing the selection object in the first operational state S1.

Figure 7B:
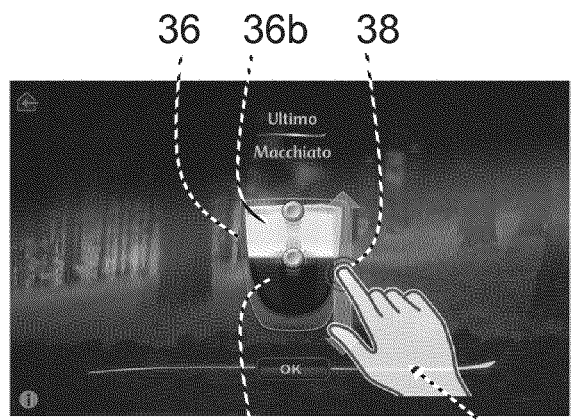

FIG. 7B shows an example of the graphical user interface in the second operational state S2 of the device. In this operational state the user may further tune the selection made in operational state S1, e.g. by adding further ingredients such as sugar or milk. In this embodiment the graphical user interface displays a further background image corresponding to a selection of a background image that corresponds to a position designated in the first operational state S1. In this case for example the user has selected a position in the upper left part of the screen and the further background image corresponds to the image in this part of the screen. Images are considered to correspond if they are the same or similar according to a similarity measure. The similarity measure may for example be a similarity in color distribution or a similarity in other image statistics.

The correspondence between the selection of the background image in state S1 and the further background image in state S2 serves as confirmation of the choice made by the user in the first operational state. By way of example FIG. 7B shows a graphical user interface in a second state S2 of the device that enables the user 9 to add a further ingredient. In this exemplary second operational state S2 a holder 36 for a beverage is presented. The holder 36 is filled for a first fraction 36a with a first color indicative for a fraction of a blend of ingredients selected by the user in the previous operational state and for a second fraction 36b with a second color indicative for the further ingredient. Here, the user is enabled to control the amount of said further ingredient by shifting a visual control element 38. Alternatively, the graphical user interface may for example provide a "+" button for increasing the amount of the further ingredient and a "−" button for decreasing the amount of the further ingredient.

In another implementation of this second operational state a holder for a beverage is presented filled with a color that is a weighted average of a first color indicative for the selected blend of ingredients and a second color indicative for the further ingredient. Therein the contribution of the first color in the applied weighting corresponds to the fraction of the selected blend of ingredients and the contribution of the second color corresponds to the fraction of the further ingredient.

After the user has acknowledged a selection in the third state S3, e.g. by touching the OK button, the device assumes a fourth operational state S4 wherein a beverage is prepared in accordance with the specifications entered by the user in the previous states.

Figure 8:
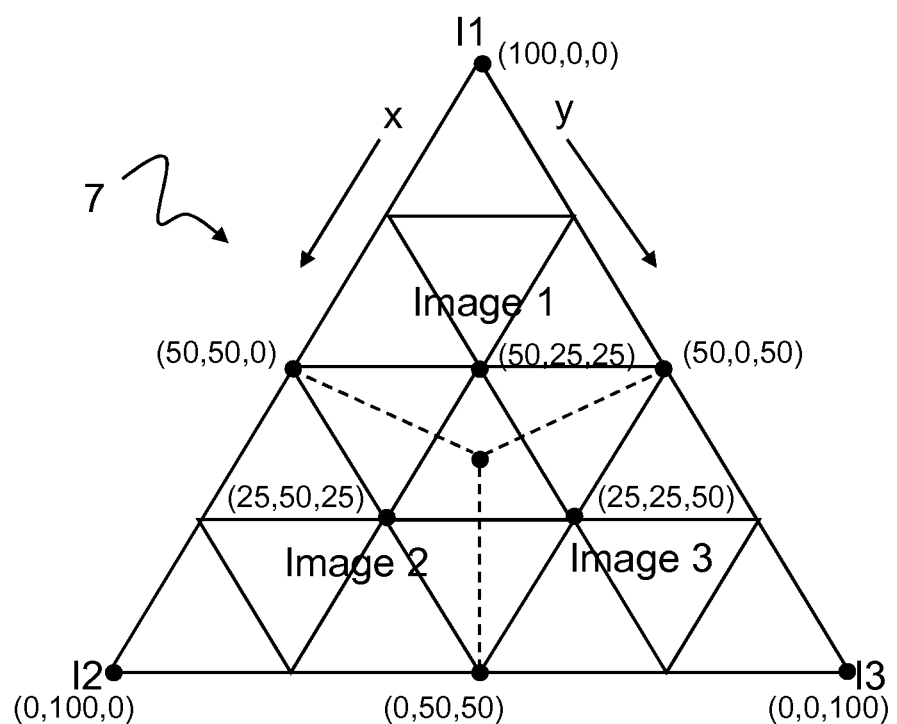

FIG. 8 shows an alternative user interface, wherein the user can select a composition of 3 ingredients I1, I2 and I3 in a triangular selection space 7. In this triangular selection space 7 the component x of the position determines the relative contribution of ingredients I1 and I2. The component y of the position determines the relative contribution of ingredients I1 and I3.

More in particular the contribution of the ingredients in the beverage to be prepared is:

$$I1=F(100-x-y); I2=F(100*x); I3=F(100*y).$$

Therein F is a monotonous function. The monotonous function can be linear, or non-linear. Due to the (stepwise) monotonous relationship between the components x, y of the position and the relative contribution of the ingredients in the beverage to be prepared, the result obtained by the selection of the user is predictable so that it is not necessary to explicitly represent each possible selection in the graphical user interface. Therewith the full area of the screen is available to display an indication of the ingredients I1, I2, I3 that can be used to compose the beverage to be prepared. For example each of the three corners mutually separated by dashed lines in the triangular zone may comprise an image indicative of a respective ingredient. The indications are for example a first image Image 1 in the top corner of the triangular zone representative for the first ingredient I1, a second image Image 2 in the bottom left corner representative for the second ingredient I2 and a third image Image 3 in the bottom right corner representative for the third ingredient I3.

Figure 9:
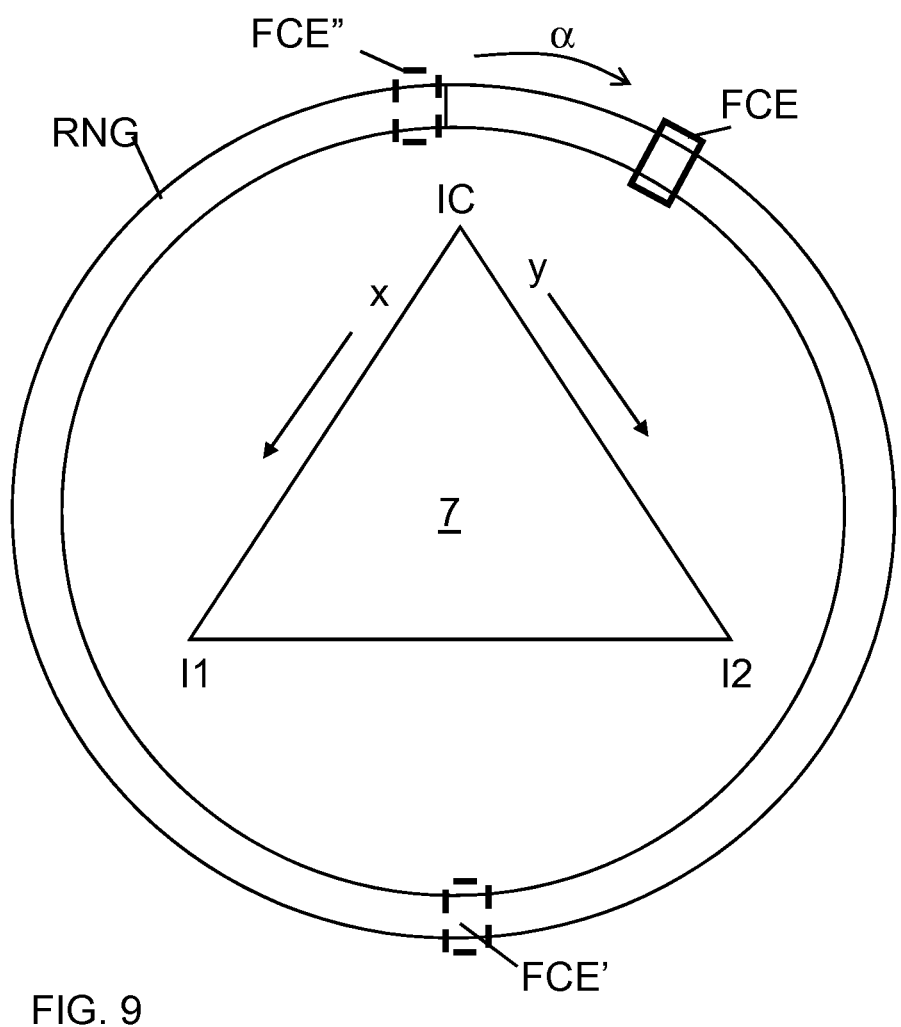

A selection space 7, for example according to the embodiments described with reference to FIG. 3A, B; FIGS. 6A-6D; and FIG. 8, may be combined with one or more further control elements. These further control elements can be used for specifying the composition of an ingredient to be blended with other ingredients. FIG. 9 shows an example thereof. The user interface presented in FIG. 9 comprises the triangular selection space as described with reference to FIG. 8. By indicating a position x,y within the triangular selection space 7 the user can specify a blend comprising ingredients I1, I2 and IC. Therein I1 and I2 are predetermined ingredients and IC is a controllable ingredient. For example I1 and I2 are two different types of coffee and IC is a controllable additive, for example a mixture of cow milk and soy mild according to a mixture ratio to be specified by the angular position a of further control element FCE along the ring RNG. By way of example, in the indicated position of the control element the controllable additive may comprise 10% soy milk and 90% cow milk. By moving the further control element FCE along direction a the percentage of soy milk may be increased, for example to 50% in position FCE' and to 100% in position FCE". This selected mixture is then used as the controllable ingredient IC.

Figure 10:
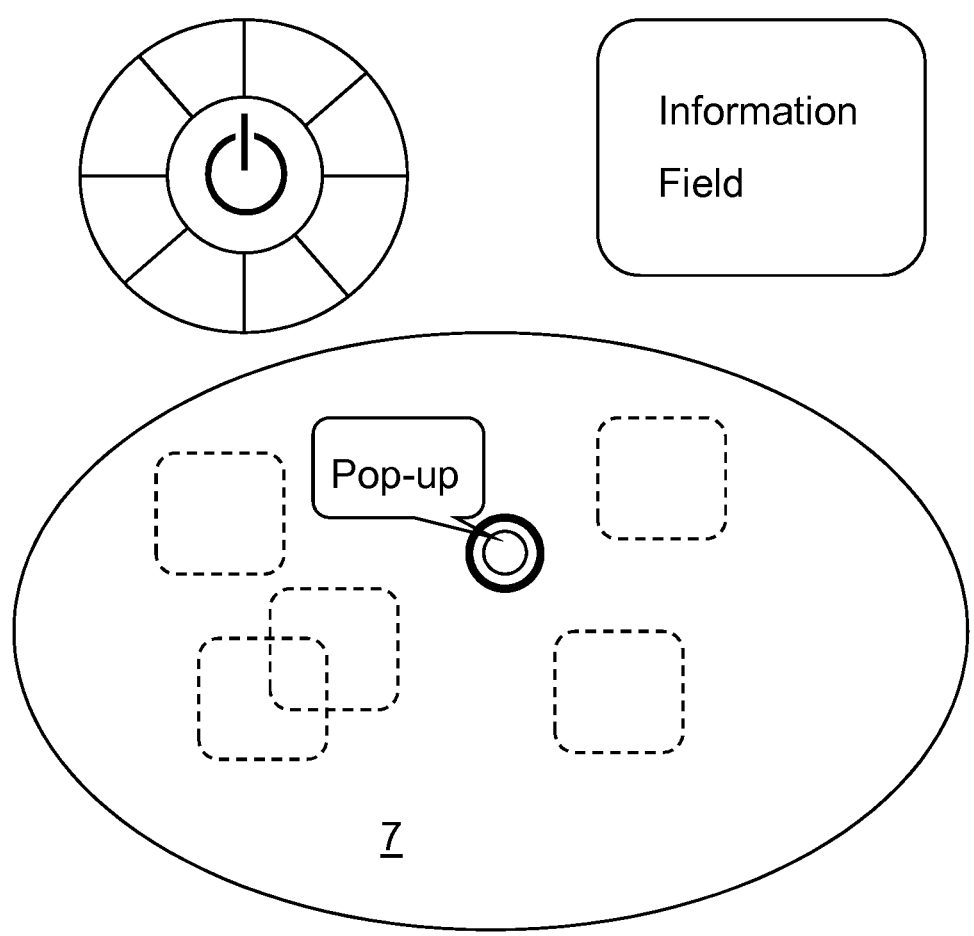

FIG. 10 illustrates that a two-dimensional space used for specifying the composition is not necessary polygonal. The space of selectable positions (selection space 7) may for example be restricted so that only those positions can be selected that would result in a beverage of an acceptable composition. This aids the user in preventing that an unconsumable beverage is prepared. By way of example FIG. 10 shows an embodiment of the present invention wherein the selection space 7 is oval. In order to aid the user in making a selection an information field may be provided that informs the user about the composition that corresponds to the indicated position in the selection space. For example the following message may be presented therein "YOUR BLEND: You have chosen a medium roast coffee with crisp and tangy tasty notes". The information field may also be used to question the user whether the composition corresponding to the selected location should be saved, and whether it should be given a name. Additionally or alternatively at the location indicated by the user a pop-up message may appear with such a message or question. When the indicated location matches the location of a predefined taste, e.g. smooth roast, this may also be shown in the information field or as a pop-up message.

Figure 11:
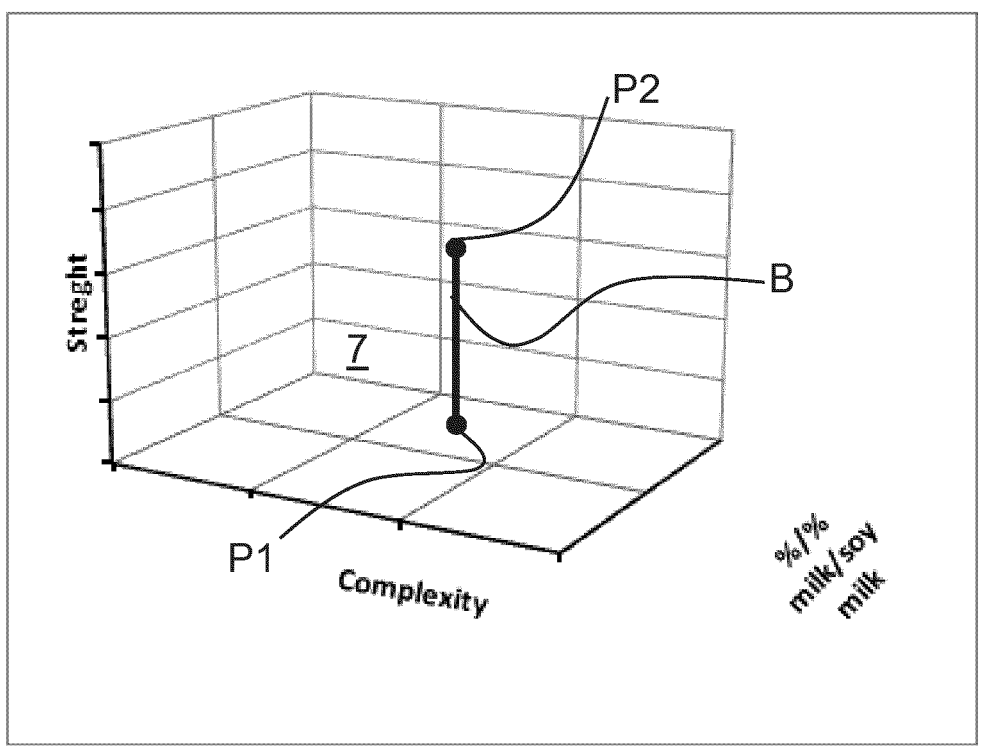

FIG. 11 shows a further example of an embodiment wherein the user is enabled to indicate a position in a three-dimensional selection space 7 in order to specify a formulation of a beverage to be prepared. In this case the user can specify the strength, the complexity and a ratio of cow milk and soy milk. In this example a bar B is displayed having a first endpoint P1 in the bottom plane formed by the complexity axis and the milk ratio axis and a second endpoint P2. The length of the bar B extending between the endpoints P1 and P2 indicates the strength of the blend. The user interface may allow the user to specify the complexity and milk ratio by positioning point P1 and to specify the strength by positioning point P2. In an embodiment the movement of P2 is restricted along the longitudinal direction defined by the bar B.

Figure 12:
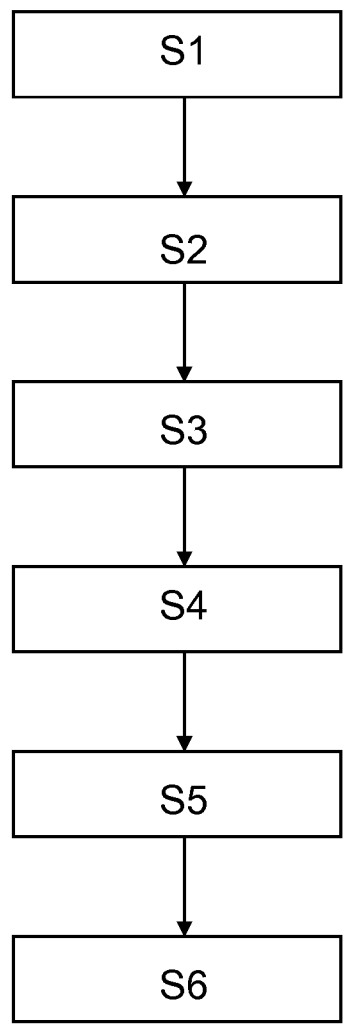

FIG. 12 schematically shows an embodiment of a method for preparing a beverage. A selection element (e.g. 32 in FIG. 6A-D) is shown in step S2 that enables the user to indicate a position in an at least two-dimensional space in order to specify a formulation of a beverage to be prepared. In the embodiment shown the second step is preceded by a first step S1 wherein a background image is displayed that outlines the extremes between which a formulation can be composed, e.g. by indicating the available ingredients.

In step S3 the user is enabled to move the selection element to the desired position, e.g, to one of the positions e.g. 34a-d shown in FIGS. 6A to 6D respectively, therewith setting a respective value of at least a first and a second parameter of said formulation in accordance with respective components of the indicated position in respective directions in said space. The respective values of the at least a first and second parameter are dependent on the components of the indicated position in a monotonic manner.

The user is then enabled to activate a selection element in step S4, as illustrated in FIG. 7A for example. This step may be implicit, e.g., by releasing the selection element. Alternatively an explicit action may be required, e.g. tapping the selection element. In the embodiment shown the user is enabled in step S5, illustrated in FIG. 7B for example, to further tune the formulation of the drink to be prepared, for example by adding further ingredients, such as sugar and milk. Finally, in step S6 the device prepares the beverage in accordance with the formulation specified by the user.

The operating unit 5 of the device may be implemented with dedicated hardware or as a general signal processor programmed for that purpose. But also a combination of programmable and dedicated hardware may be used. An at least partly programmable implementation of the operating unit has the advantage that the associated software can easily be replaced, e.g., to improve the interaction with the user. The replacement software may be loaded, for example, via the internet.

Although the present invention has been shown in detail on the basis of examples and described in the drawings and the preceding description, the invention is not limited to these examples. Other variations of the exemplary embodiments disclosed may be understood and used on the basis of the description, the drawings and the claims by the skilled person in carrying out the claimed invention. In the claims, the word "comprising" does not exclude other elements or steps. The indefinite article "a" does not exclude plurality. A single processor or unit can in practice carry out functions of different elements recited in the claims. The mere fact that some features are mentioned in mutually different claims does not exclude the possibility of a favorable combination of those features. Thus, for example, it is conceivable that the different embodiments of the control unit are used in one and the same device, as desired. Reference numerals in the claims are understood not to limit the scope of protection of the claims.

What is claimed is:

1. A beverage preparation device comprising:
   a preparation unit for preparing a beverage, the preparation unit being arranged for controllably blending a plurality of ingredients incorporable in the beverage, the preparation unit comprising:
   a holder for storage of coffee,
   a holder for an ingredient,
   a heating unit,
   a dosing valve for dosing the ingredient from said holder, and
   a beverage outlet; and
   a control unit for enabling a user to control the preparation unit, the control unit comprising:
   a processor;
   a graphical user interface, controlled by the processor, for enabling a user to specify a formulation for the beverage to be prepared in accordance with at least a first parameter and a second parameter different from said first parameter, which first and second parameters are selected from two or more of:
   a ratio of a different type of a main ingredient;
   a ratio of a blend of a main ingredient with an additive;
   a ratio of different blended additives;
   a drink strength; or
   a drink volume;
   and to provide visually observable reactions to designations provided by the user, wherein the graphical user interface has an operational mode enabling the user to indicate a position in an at least two-dimensional selection space, the position having at least a first position component in a first direction in said selection space and having a second position component in a second direction in said selection space, orthogonal to the first direction,
   the processor having a mapping unit to set a respective value of said at least a first and a second parameter in accordance with said first and second position components respectively as part of the beverage preparation, the respective value of said at least a first and second parameter being dependent on the respective position components in a monotonic manner in that a value of the first parameter is an exclusively increasing or exclusively decreasing first function of the first position component and a value of the second parameter is an exclusively increasing or exclusively decreasing second function of the second position component, wherein said exclusively increasing or exclusively decreasing is continuous or stepwise, the processor for driving the preparation unit in accordance with said at least first parameter and second parameter.

2. The beverage preparation device according to claim 1, wherein at least one of said at least a first and a second parameter is a fraction of an ingredient in a blend of ingredients.

3. The beverage preparation device according to claim 1, wherein the device has a first operational state wherein the user is enabled to drag a selection object from an initial position to a further position corresponding with the desired formulation, and a second operational state wherein the user is enabled to activate said selection object in said further position.

4. The beverage preparation device according to claim 3, provided with a touch screen, wherein the device assumes the second operational state when the user releases the touch screen after having dragged the selection object to the further position.

5. The beverage preparation device according to claim 1, wherein the graphical user interface for enabling a user to specify a formulation is arranged to display a background image, and after designation of a position, to display a further background image corresponding to a selection of said background image.

6. The beverage preparation device according to claim 5, comprising an operational state for enabling the user to add a further ingredient, wherein in said operational state a holder for a beverage is presented filled for a first fraction with a first color indicative for a fraction of a blend of ingredients selected by the user and for a second fraction with a second color indicative for the further ingredient.

7. The beverage preparation device according to claim 5, comprising an operational state for enabling the user to add a further ingredient, wherein in said operational state a holder for a beverage is presented filled with a color that is a weighted average of a first color indicative for the selected blend of ingredients and a second color indicative for the further ingredient, wherein in the applied weighting the contribution of the first color corresponds to the fraction of the selected blend of ingredients and the contribution of the second color corresponds to the fraction of the further ingredient.

8. The beverage preparation device according to claim 1, wherein the first parameter is a relative contribution of ingredients in a blend of ingredients and wherein the second parameter is the concentration of the blend of ingredients in water.

9. A beverage preparation device comprising:
a preparation unit for preparing a beverage, the preparation unit being arranged for controllably blending a plurality of ingredients incorporable in the beverage, the preparation unit comprising:
a holder for storage of coffee,
a holder for an ingredient,
a heater, and
a beverage outlet; and
a control unit for enabling a user to control the preparation unit, the control unit comprising:
a processor;
a graphical user interface, controlled by the processor, for specifying a formulation for the beverage to be prepared in accordance with at least a first parameter and a second parameter different from the first parameter, and to provide visually observable reactions to designations associated with the first parameter and the second parameter, wherein the graphical user interface has an operational mode that provides an indication of a position in an at least two-dimensional selection space, the position having at least a first position component in a first direction of said selection space and having a second position component in a second direction in said selection space, the second direction orthogonal to the first direction,
the processor configured to map a respective value of said at least a first and a second parameter in accordance with said first and second position components respectively, the respective value of said at least a first and second parameter being dependent on the position components in said respective directions in a monotonic manner in that a value of the first parameter is an exclusively increasing or exclusively decreasing first function of the first position component of the position and the value of the second parameter is an exclusively increasing or exclusively decreasing second function of the second position component, wherein said exclusively increasing or exclusively decreasing is continuous or stepwise,
the processor for driving the preparation unit in accordance with said at least first parameter and second parameter, and
wherein the first and second parameters comprise two or more of: a drink strength, a drink volume, a ratio of a main ingredient with an additive, or a ratio of blended additives.

* * * * *